(12) United States Patent
Watanabe et al.

(10) Patent No.: US 9,486,794 B2
(45) Date of Patent: Nov. 8, 2016

(54) HONEYCOMB FORMED BODY EXTRUDING DIE

(71) Applicant: NGK Insulators, Ltd., Nagoya (JP)

(72) Inventors: Takehiko Watanabe, Nagoya (JP);
Seiichiro Hayashi, Nagoya (JP);
Kazuhiko Hamatsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/885,085

(22) Filed: Oct. 16, 2015

(65) Prior Publication Data

US 2016/0136633 A1  May 19, 2016

(30) Foreign Application Priority Data

Nov. 18, 2014  (JP) .................................. 2014-233975

(51) Int. Cl.
| | |
|---|---|
| *B23P 15/24* | (2006.01) |
| *B28B 3/26* | (2006.01) |
| *B29C 47/12* | (2006.01) |
| *B01J 35/04* | (2006.01) |
| *B29C 47/00* | (2006.01) |

(52) U.S. Cl.
CPC .............. *B01J 35/04* (2013.01); *B23P 15/243* (2013.01); *B28B 3/269* (2013.01); *B29C 47/12* (2013.01); *B29C 47/0028* (2013.01)

(58) Field of Classification Search
CPC . B23P 15/243; B28B 3/269; B29C 47/0028; B29C 47/12
See application file for complete search history.

(56) References Cited

U.S. PATENT DOCUMENTS

| | | | | |
|---|---|---|---|---|
| 4,290,743 A | * | 9/1981 | Suzuki | B28B 3/269 |
| | | | | 264/177.12 |
| 4,349,329 A | * | 9/1982 | Naito | B28B 3/269 |
| | | | | 264/177.12 |
| 6,287,103 B1 | * | 9/2001 | Miyazaki | B28B 3/269 |
| | | | | 264/177.12 |
| 2007/0026188 A1 | * | 2/2007 | Bookbinder | B29C 47/0028 |
| | | | | 428/73 |
| 2007/0164456 A1 | * | 7/2007 | Kanmura | B28B 3/269 |
| | | | | 257/787 |
| 2008/0017520 A1 | * | 1/2008 | Koishikura | B23H 9/00 |
| | | | | 205/640 |

FOREIGN PATENT DOCUMENTS

| | | |
|---|---|---|
| JP | 61-020403 B2 | 5/1986 |
| JP | 08-169005 A1 | 7/1996 |
| JP | 11-138354 A1 | 5/1999 |
| JP | 2008-194848 A1 | 8/2008 |

OTHER PUBLICATIONS

Extended European Search Report (Application No. 15193255.5) dated Apr. 25, 2016.

* cited by examiner

*Primary Examiner* — Yogendra Gupta
*Assistant Examiner* — Joseph Leyson
(74) *Attorney, Agent, or Firm* — Burr & Brown, PLLC

(57) ABSTRACT

A die has two surfaces, in a forming material supplying surface which is one surface, a plurality of back holes to introduce a forming material of a honeycomb formed body into the die are formed, and in a honeycomb formed body extruding surface which is the other surface, lattice-shaped slits corresponding to cell partition walls are formed, the back holes communicate with the slits in slit intersecting portions of the slits, polygonal cell blocks defined by the slits include chamfered portions in which parts of corner portions and the like are chamfered at a chamfering angle θ of 1.0 to 8.0° to the extruding direction, from the honeycomb formed body extruding surface toward a slit depth direction, and straight portions which are not chamfered, and a ratio of a length L of the straight portion to a slit depth D is from 20 to 60%.

6 Claims, 5 Drawing Sheets

HONEYCOMB FORMED BODY EXTRUDING DIE

The present application is an application based on JP 2014-233975 filed on Nov. 18, 2014 with the Japan Patent Office, the entire contents of which are incorporated herein by reference.

BACKGROUND OF THE INVENTION

1. Field of the Invention

The present invention relates to a honeycomb formed body extruding die. More particularly, it relates to a honeycomb formed body extruding die which is for use in extrusion of a honeycomb formed body and is capable of inhibiting deformation of cell partition walls of the honeycomb formed body.

2. Description of the Related Art

Heretofore, in a manufacturing method of manufacturing a honeycomb structure made of a ceramic material, an extruding die of the honeycomb formed body (hereinafter simply referred to as "the die") has been used, and there has broadly been performed an extruding method of extruding a forming material (a kneaded material) from the die. Here, the die generally has a lattice-shaped slits disposed in one surface of a die substrate and having a width corresponding to a partition wall thickness of cell partition walls of the honeycomb formed body which becomes a forming object, and back holes formed in the opposite surface of the die substrate to communicate with the slits. The back holes are disposed at positions corresponding to slit intersecting portions in which the lattice-shaped slits intersect with one another, and in the die substrate, the back holes communicate with the slits in the slit intersecting portions. In consequence, the forming material introduced from the back holes on a die backside into the die substrate is discharged from the back holes toward a die front side formed with the slits. Further, there is extruded the honeycomb formed body having a plurality of cells defined by cell partition walls corresponding to a slit shape and having a rectangular or hexagonal shape. The manufacturing of the honeycomb structure includes kneaded material preparation, extrusion, raw cutting, drying, finish-cutting and firing steps. Here, the material from the extrusion before firing is referred to as the honeycomb formed body, and the fired honeycomb formed body is referred to as the honeycomb structure.

The die is constituted of a metal block of a stainless alloy, cemented carbide or the like, a plurality of back holes are bored in the metal block on its one surface side by drill processing or the like, and slits communicating with the back holes in the slit intersecting portions from the other surface side of the metal block are formed by using a well-known metal processing technology such as grind processing or discharge processing (see Patent Document 1).

In a case where the extrusion of the honeycomb formed body is performed by using this die, when a local deviation is present in the dimension or surface roughness of each portion of the die, a local deviation of a flow resistance occurs to the forming material, and a difference is locally made in extruding speed to a cross sectional direction of the honeycomb formed body. Due to this difference in extruding speed, the cell partition walls are deformed when the material is extruded from the die, and it might become difficult to form the honeycomb formed body having a suitable cell shape. For example, there might occur a deformation in which lattice-shaped cell partition walls defining the respective cells of the honeycomb formed body wind along a cell longitudinal direction (matching an extruding direction), a deformation in which the cell partition walls wind along an orthogonal direction (matching the above cross sectional direction) to the cell longitudinal direction, and a deformation in which these deformations are combined. Such a deformation occurs especially remarkably in the honeycomb formed body in which an open frontal area of an end face is large (e.g., 85% or more), i.e., the honeycomb formed body in which a partition wall thickness of the cell partition walls having a larger cell area than the end face is small. The above cell deformations, not only deteriorate a mechanical strength of the honeycomb structure, but also bring clogging of catalyst coating or increase of passed air resistance in loading a catalyst, when the honeycomb structure is used as a catalyst carrier.

Concerning such a defect of the cell shape of the honeycomb formed body, a fluidity in the die is locally regulated, and the extruding speed (a flow speed) of the forming material to be extruded through the slits is regulated in a predetermined range, whereby the occurrence of the deformation of the cell shape in the honeycomb formed body can be decreased. In consequence, the honeycomb formed body having a stabilized quality can continuously be formed.

On the other hand, it is known that corner portions of each of polygonal cell blocks defined by the slits formed on an extrusion side of the die are rounded or chamfered, whereby roundness is provided in each cell corner portion of the honeycomb formed body to be extruded, a thickness of a catalyst coating layer to be loaded onto the honeycomb structure is uniformed, and there is inhibited generation of disadvantages such as cracks or breaks due to concentration of stress to be applied to the corresponding portion when the honeycomb structure is dried and fired (see Patent Documents 2 and 3).

[Patent Document 1] JP-A-H11-138354
[Patent Document 2] JP-B-S61-20403
[Patent Document 3] JP-A-H08-169005

SUMMARY OF THE INVENTION

However, there is the possibility that a local fluidity regulating operation of a die causes the following problem. That is, it is necessary to visually confirm a cell shape of a honeycomb formed body extruded from an extruder and then determine a region of the die which is to be regulated or a degree of the regulation, and such determination is often performed on the basis of operator's long experience or intuition. Additionally, it is necessary to repeat an operation of performing the regulating operation, attaching the regulated die to the extruder again, further preparing a trial honeycomb formed body and visually confirming the cell shape of the trial honeycomb formed body. As a result, a lot of time might be required to regulate the die so that it is possible to extrude the honeycomb formed body having a finally regulated end face shape which is not deformed due to winding or the like. In consequence, the delay might be caused in an operation of forming the honeycomb formed body.

Especially in the case of the honeycomb formed body in which an open frontal area of an end face is large, a partition wall thickness of cell partition walls defining respective cells might locally decrease by the local fluidity regulation. When the cell partition walls of the honeycomb formed body locally become thin, cuts might be generated in the cell partition walls in a drying step or a firing step. On the other hand, a die having chamfered portions in polygonal cell block corner portions is developed mainly for the purpose of stress alleviation in the drying and firing after forming processes, and is not developed for the purpose of quality improvement in the extrusion.

Thus, the present invention has been developed in view of the above conventional actual situations, and an object thereof is to provide a die which is capable of obviating the need for a regulating operation of the die and especially inhibiting deformation due to winding of cell partition walls of a honeycomb formed body having a large open frontal area.

According to the present invention, there is provided a honeycomb formed body extruding die in which the above object is achieved.

[1] A honeycomb formed body extruding die to extrude a honeycomb formed body, the die having two surfaces, wherein in a forming material supplying surface which is one surface, a plurality of back holes to introduce a forming material of the honeycomb formed body into the die are formed in an extruding direction, and in a honeycomb formed body extruding surface which is the other surface, lattice-shaped slits corresponding to cell partition walls of the honeycomb formed body are formed in the extruding direction, the back holes communicate with the slits in slit intersecting portions of the slits, polygonal cell blocks defined by the slits include: chamfered portions in which parts of corner portions are chamfered at a chamfering angle of 1.0 to 8.0° to the extruding direction, from the honeycomb formed body extruding surface toward a slit depth direction; and straight portions which are not chamfered, and a ratio of a length of the straight portion to a slit depth is from 20 to 60%.

[2] The honeycomb formed body extruding die according to the above [1], wherein widths of the slits are from 50 to 130 μm.

[3] The honeycomb formed body extruding die according to the above [2], wherein a ratio of a slit side intersection point width to a back hole side intersection point width in the slit intersecting portions is from 1.5 to 2.5.

[4] The honeycomb formed body extruding die according to any one of the above [1] to [3], wherein a curvature radius of each of corner portions of the straight portion is from 0.03 to 0.08 μm.

[5] The honeycomb formed body extruding die according to any one of the above [1] to [4], wherein an abrasion resistant layer is formed on the surface of each of the polygonal cell blocks.

[6] The honeycomb formed body extruding die according to any one of the above [1] to [4], wherein the polygonal cell blocks are made of a cemented carbide material.

According to a die of the present invention, the die includes chamfered portions and straight portions formed in polygonal cell blocks, and hence, deformation of cell partition walls of a honeycomb formed body can be inhibited.

DESCRIPTION OF THE PREFERRED EMBODIMENTS

Figure 1:
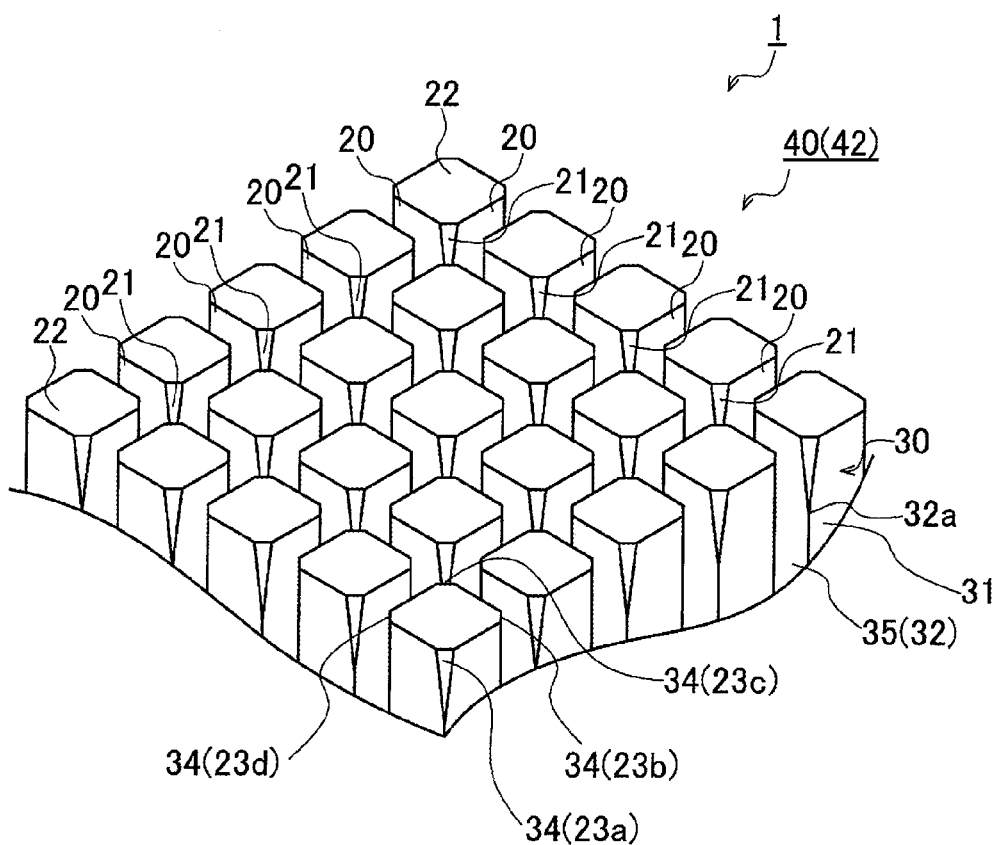
FIG. 1 is an enlarged perspective view schematically showing polygonal cell blocks of a die of the present invention.
Figure 2:
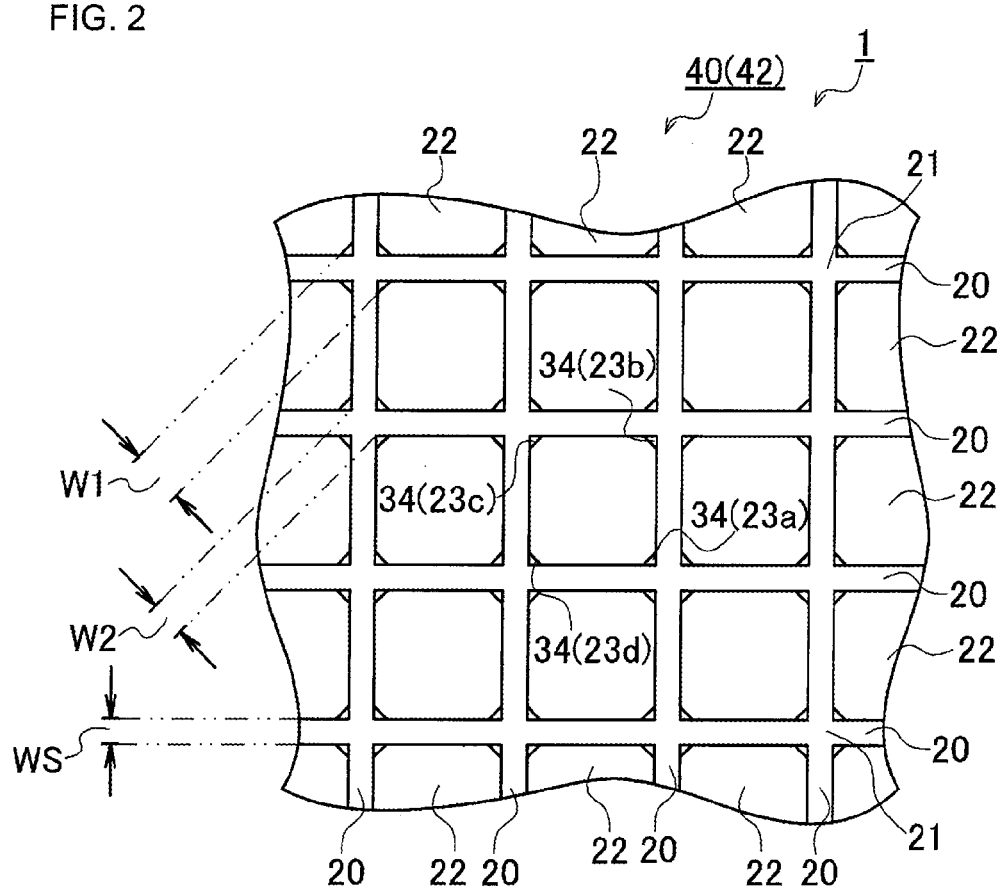
FIG. 2 is an enlarged plan view schematically showing the polygonal cell blocks of the die.
Figure 3:
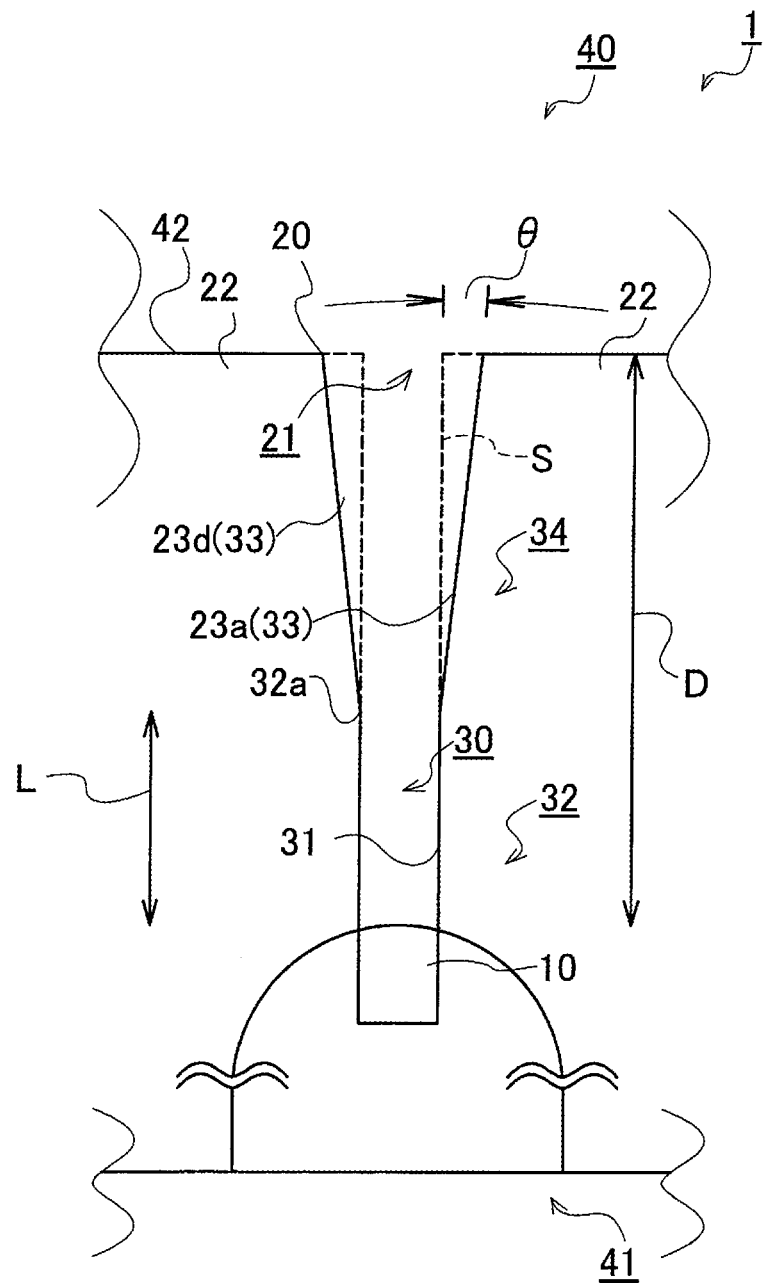
FIG. 3 is an enlarged cross-sectional view schematically showing a part of the die.

Hereinafter, embodiments of a die of the present invention will be described in detail with reference to the drawings. It is to be noted that the die of the present invention is not limited to the following embodiments, and various changes, modifications, improvements and the like of design can be added without departing from the gist of the present invention.

As shown mainly in FIG. 1 to FIG. 4, a die 1 of one embodiment of the present invention is mainly constituted of a plurality of back holes 10 to introduce a forming material (not shown) as a raw material of a honeycomb formed body 100 from a die backside, lattice-shaped slits 20 formed at a slit width WS corresponding to a partition wall thickness R of cell partition walls 101 of the honeycomb formed body 100, and a die substrate 40 having the back holes 10 and slit intersecting portions 21 of the slits 20, and the back holes 10 communicate with the slits 20 in the slit intersecting portions 21. The back holes 10 and the slits 20 are formed in an extruding direction (corresponding to a paper surface upward direction in FIG. 3) of the honeycomb formed body 100. There is a case where the back holes 10 communicate with all the slit intersecting portions 21 and a case where the back holes 10 communicates with every other slit intersecting portion 21.

Here, the slit intersecting portions 21 are disposed in the die substrate 40 to include spaces in which the back holes 10 bored in a forming material supplying surface 41 of the die substrate 40 communicate with the groove-shaped slits 20 formed in a honeycomb formed body extruding surface 42 facing the forming material supplying surface 41. Further specifically, each of the slit intersecting portions 21 includes an intersecting portion base portion 30 surrounded by a straight portion 32 formed in a region with which a straight wall surface 31 intersects, and a chamfered portion 34 surrounded by an inclined wall surface 33 obtained by chamfering a part of each of corner portions 23a, 23b, 23c and 23d of each polygonal cell block 22 of the die substrate 40 which are defined by the slits 20 obliquely to the extruding direction from one end 32a of the straight portion 32.

As shown in FIG. 1, the die substrate 40 is mainly constituted of a metal block, and constructed by utilizing a well-known metal processing technology such as drill processing or grind processing. It is to be noted that, as a processing technology of chamfering the respective corner portions 23a and the like in an oblique direction to the polygonal cell blocks 22 defined by the slits 20 to form the chamfered portions 34, there is usable, for example, a discharge processing technology disclosed in Patent Document 3 titled "Honeycomb Forming Die and Manufacturing Method of Honeycomb Formed Body" or the like. That is, to match a chamfering angle θ of each of the chamfered portions 34 (details will be described later), discharge electrodes are previously processed into a tapered shape and discharge processing is performed by using the processed discharge electrodes. In consequence, the chamfered portions 34 corresponding to the tapered shapes of the discharge electrodes can comparatively easily be prepared at low cost. It is to be noted that the processing to the die substrate 40 is not limited to the illustrated technique and technology, and is changeable as required. In addition, FIG. 1 shows a part of the die 1 of the present embodiment in a simplified manner.

The chamfered portions 34 are formed so that the chamfering angle θ of each chamfered portion is in a range of 1.0 to 8.0° and further preferably 2.0 to 4.0°. The chamfering angle θ is an angle of the inclined wall surface 33 of the chamfered portion 34 which is enlarged from the one end 32a of the straight portion 32 in the slit intersecting portion 21 toward a slit 20 side. Further specifically, the chamfering angle θ is an angle formed between a virtual straight line S (see a broken line in FIG. 3) extended from the one end 32a of the straight portion 32 along the extruding direction of the honeycomb formed body 100 and the inclined wall surface 33 of the chamfered portion 34 which is bent to enlarge from the one end 32a of the straight portion 32 to the slit 20 side.

The die 1 of the present embodiment is further set so that a length L of the straight portion 32 to a slit depth D is in a range of 20 to 60% and further preferably 25 to 50%. The slit depth D is a depth of each of the slits 20 formed in the die substrate 40, and corresponds to a distance from a boundary position between the back hole 10 and the slit intersecting portion 21 to the honeycomb formed body extruding surface 42. On the other hand, the length L of the straight portion 32 corresponds to a distance from the boundary position between the back hole 10 and the slit intersecting portion 21 (the straight portion 32) to the one end 32a of the straight portion 32 (a boundary position between the straight portion 32 and the chamfered portion 34). That is, the die 1 of the present invention is set so that a value of "L/D×100" which is a ratio of the length L of the straight portion 32 to the slit depth D is in the above range (see FIG. 3).

Figure 4:
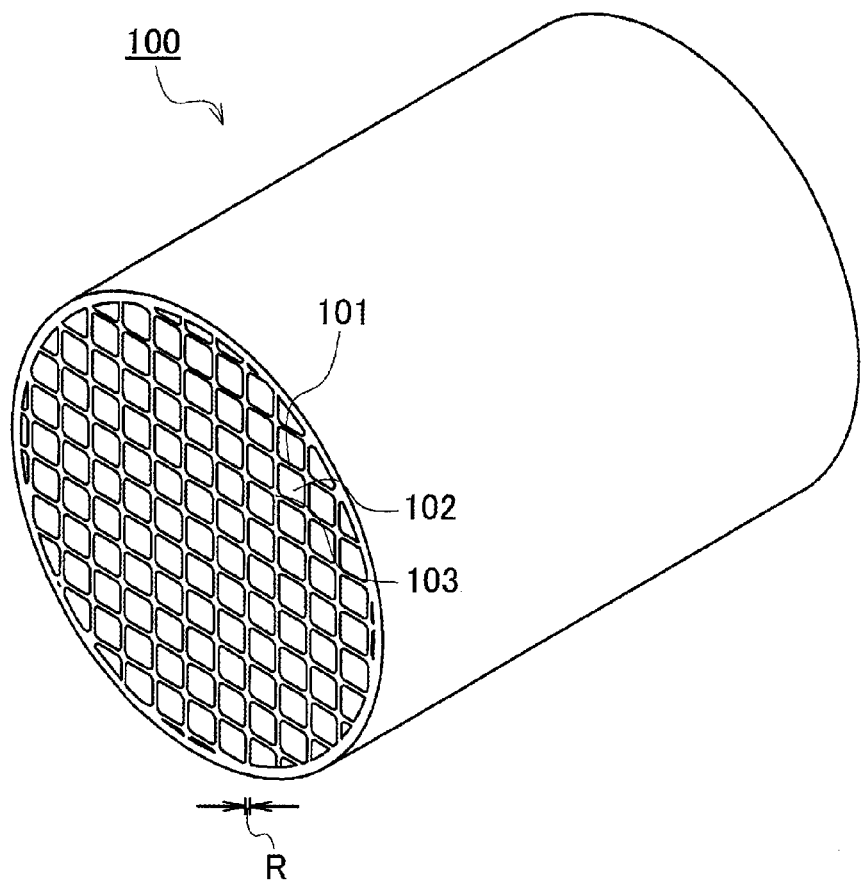
FIG. 4 is a perspective view schematically showing one example of a honeycomb formed body extruded by using the die.

Furthermore, in the die 1 of the present embodiment, a maximum slit side intersection point width W1 of the slits 20 opened in the honeycomb formed body extruding surface 42 is set to a range of 50 to 130 μm. The slit side intersection point width W1 directly influences the partition wall thickness R of the cell partition walls 101 of the honeycomb formed body 100 to be extruded and a thickness of each of honeycomb intersection portions 103. When the slit side intersection point width W1 is set to the above range, it is possible to extrude the honeycomb formed body 100 having a plurality of cells 102 defined by the cell partition walls 101 in which the partition wall thickness R is from 2.0 to 4.5 mil (1 mil=25.4 μm). In consequence, it is possible to use the die 1 of the present embodiment in the extrusion of the honeycomb formed body 100 in which the partition wall thickness R of the cell partition walls 101 is small, i.e., an open frontal area of the cells 102 in an end face is large. It is to be noted that FIG. 4 schematically shows the honeycomb formed body 100. That is, the respective cells 102 and the cell partition walls 101 are shown larger than actual.

The die 1 of the present embodiment is set so that a ratio (=W1/W2) of the slit side intersection point width W1 of each slit 20 to a back hole side intersection point width W2 of each back hole 10 through which the forming material is introduced is in a range of 1.5 to 2.5 and further preferably 1.7 to 2.3. Here, the back hole side intersection point width W2 matches a width of each of the mutually facing straight wall surfaces 31 of the straight portion 32 extended from the back hole 10. Therefore, such a ratio noticeably exerts an influence on a difference between extruding speeds in the straight portion 32 and the chamfered portion 34.

When the honeycomb formed body 100 is extruded by using the die 1 of the present embodiment, the forming material is first introduced from the forming material supplying surface 41 of the die substrate 40 through the back holes 10 into the die substrate 40. Here, the forming material introduced inwardly from the back holes 10 is regulated through a well-known mixing step and kneading step, and the material moves in the extruding direction of the honeycomb formed body 100 while being diffused from the intersecting portion base portion 30 into the slits 20 due to an extruding pressure by the extruder.

The introduced forming material reaches the chamfered portions 34 from the intersecting portion base portion 30. Here, each of the chamfered portions 34 is surrounded by the inclined wall surface 33 enlarged from the one end 32a of the straight portion 32 toward the slit 20 side. Therefore, the forming material allowed to reach the chamfered portion 34 moves from the one end 32a of the straight portion 32 in the extruding direction, and also moves in the chamfered portion 34 while enlarging in an orthogonal direction. The diffusion into the slits 20 also continues. The forming material allowed to reach the honeycomb formed body extruding surface 42 is extruded as the honeycomb formed body.

Also, when the honeycomb formed body is formed by using a usual die which does not have the chamfered portions 34, the cell corner portions of the honeycomb formed body are slightly rounded. It is considered that the roundness of each cell corner portion is formed when the forming material is extruded from the honeycomb formed body extruding surface 42, and it is suggested that the forming material receives a strong pressure from the corner portions of the polygonal cell blocks. In addition, fine burrs or cracks are present in the polygonal cell block corner portions, and hence, it is considered that the forming material receives a strong resistance from the polygonal cell block corner portions and that this strong resistance is a cause for the above strong pressure. The forming material receives the strong resistance from the slits 20 in the slit intersecting portions 21, and hence, there is the tendency that the extruding speed of the forming material in the slit intersecting portions 21 is lower than the extruding speed of the forming material in the slits 20. When the difference between the extruding speeds is excessively large, the extruded cell partition walls 101 excessively become larger than the honeycomb intersection portions 103, and it is considered that there occurs a deformation in which the cell partition walls 101 wind.

The chamfered portions 34 have the effect of alleviating the resistance received from the slit intersecting portions 21 by the forming material, and the deformation due to the winding in a longitudinal direction or a cross sectional direction can be eliminated. When the chamfering angle θ in the chamfered portions 34 is set to an angle smaller than 1.0°, the effect of alleviating the resistance received from the slit intersecting portions 21 by the forming material cannot sufficiently be obtained. Therefore, the chamfering angle θ is defined as at least 1.0° or more. On the other hand, when the chamfering angle θ is set to an angle larger than 8.0°, the honeycomb intersection portions 103 of the honeycomb formed body 100 are excessively larger than those of a honeycomb formed body which can be obtained by using a usual die, a product weight increases, and eventually, a performance of a catalyst carrier is impaired. There collapses a balance between the extruding speed of the forming material in the slit intersecting portions and the extruding speed of the forming material in slit portions, whereby the deformation in which the cell partition walls 101 wind might occur. Therefore, the chamfering angle θ is defined in a range of 1.0 to 8.0°. The chamfering angle θ is further preferably from 2.0 to 4.0°.

On the other hand, when a ratio (a straight portion ratio) of the length L of the straight portion 32 to the slit depth D departs from the above range, i.e., when the length L of the straight portion 32 is shorter than the slit depth D or when the length L of the straight portion 32 is excessively longer than the slit depth D, the balance between the extruding speed of the forming material in the slit intersecting portions and the extruding speed of the forming material in the slit portions collapses in the same manner as in the chamfering angle θ described above, whereby the deformation in which the cell partition walls 101 wind occurs. Thus, in the die 1 of the present embodiment, the ratio of the slit depth D to the length L of the straight portion 32 is defined in a range of 20 to 60%. The ratio of the slit depth D to the length L of the straight portion 32 is further preferably from 25 to 50%.

Furthermore, a ratio (an intersection point width ratio) between the slit side intersection point width W1 on the side of the honeycomb formed body extruding surface 42 and the back hole side intersection point width W2 on the side of the forming material supplying surface 41 also noticeably influences the balance between the extruding speed of the forming material in the slit intersecting portions and the extruding speed of the forming material in the slit portions. Therefore, the ratio between the slit side intersection point width W1 and the back hole side intersection point width W2 is defined, and is preferably from 1.5 to 2.3 and further preferably from 1.7 to 2.3. It is to be noted that the slit side intersection point width W1 and the back hole side intersection point width W2 are determined on the basis of the partition wall thickness R of the cell partition walls 101 of the honeycomb formed body 100 to be extruded, the abovementioned chamfering angle θ, and the abovementioned straight portion ratio.

As described above, the die 1 of the present invention satisfies the conditions of the chamfering angle θ, the straight portion ratio and the intersection point width ratio, so that it is possible to extrude the honeycomb formed body 100 of a stable end face shape in which the deformation due to the winding in the cell longitudinal direction and the cross sectional direction hardly occurs.

Figure 5:
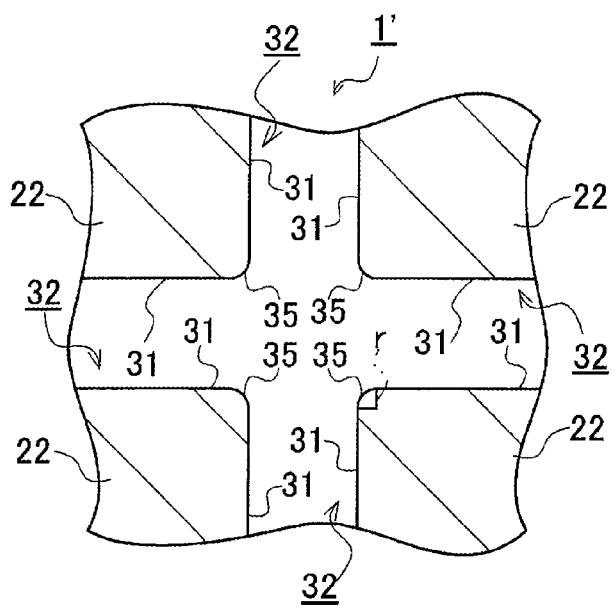
FIG. 5 is an enlarged cross-sectional view schematically showing corner portions of polygonal cell blocks of a die of another example.
Figure 6:
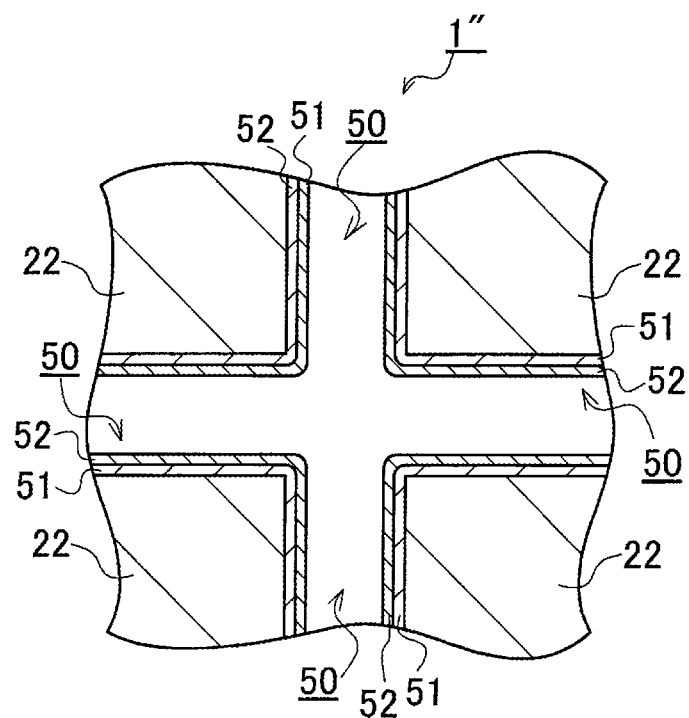
FIG. 6 is an explanatory view schematically showing one example of an abrasion resistant layer formed on each polygonal cell block straight portion.

In the straight portions 32 of the present invention, as shown in FIG. 5, corner portions 35 are preferably rounded. When slit processing is performed as it is as described above, fine burrs or cracks are present in polygonal cell block corner portions, and hence, a deviation is easily generated in the resistance when the forming material passes the intersecting portion base portion 30. FIG. 5 and FIG. 6 can illustrate a die 1' and a die 1" having shown constitutions, respectively. Here, to simplify the description, in FIG. 5 and FIG. 6, the same constitutions as in the die 1 of the present embodiment are denoted with the same reference numerals, and description thereof is omitted.

As shown in FIG. 5, the die 1' including straight portions 32 constituted of the rounded corner portions 35 in which a curvature radius r is from 0.03 to 0.08 µm is preferably used. In the straight portions 32 formed in a die substrate 40, a corner portion is formed by straight wall surfaces 31 orthogonal to each other, and a cross section of the corner portion generally has a right angle shape. Here, when the cross section of the corner portion has the right angle shape, there heightens the possibility that a large flow resistance is generated in a forming material flowing through straight portions 32. Therefore, the corner portions 35 of the straight portions 32 are processed into round corners formed at a predetermined curvature radius r, whereby fine burrs and cracks can be removed, and the flow resistance of the forming material flowing in the vicinity of each of the straight portions 32 can be minimized. As a result, any disturbances are not generated in the extruding speed of the forming material in the straight portions 32. In consequence, the forming material can be guided to chamfered portions 34 at a predetermined extruding speed, and there lowers the possibility that the end face shape of the honeycomb formed body 100 is affected. When the curvature radius r is smaller than 0.03 µm, the cross section of each corner portion substantially has the right angle shape, and the effect of decreasing the flow resistance of the forming material is not exerted. When the curvature radius r is larger than 0.08 µm, the honeycomb intersection portions 103 of the honeycomb formed body 100 easily become excessively larger than those of the honeycomb formed body obtained by using the usual die. It is to be noted that there is not any special restriction on a technique of forming each of the corner portions 35 at the curvature radius r. For example, a well-known metal processing technology may be used, and a desirable curvature radius r may be formed by grind processing or the like, or the surface of the corner portion 35 may be coated with a certain material as in an abrasion resistant layer 50 described later.

As shown in FIG. 6, it is also preferable to use the die 1" in which the abrasion resistant layers 50 are disposed on the surfaces of back holes 10, straight wall surfaces 31 of straight portions 32 in slit intersecting portions 21, inclined wall surfaces 33 of chamfered portions 34, and at least a part of the surface of each slit 20 or the like. That is, in the die 1" of the present invention, the abrasion resistant layers 50 are formed on surfaces which come in contact directly with a forming material. When the abrasion resistant layers 50 are formed, fine burrs or cracks of corner portions 35 are covered, and a fine curvature radius r can be disposed. It is to be noted that FIG. 6 schematically shows the abrasion resistant layers 50 on straight portions 32 in a die substrate 40.

The abrasion resistant layers 50 are made of a hard material or the like, and even when the layer comes in contact with the forming material, a contact portion is not grounded or deformed. For example, there can be shown a double layer structure including a plated layer 51 formed by depositing nickel on the surface which comes in contact with the forming material (the straight wall surface 31 in the straight portion 32, or the like) by electroless plating, and a coating layer 52 formed by coating the plated layer 51 further with a hard material made of tungsten carbide by a CVD process.

In consequence, the surface of the die 1" which comes in contact with the forming material is protected by the plated layer 51 and the coating layer 52, and hence, even when the extrusion of the honeycomb formed body 100 is repeated, deformations, defects and the like due to damages and abrasions on the surface are not generated in the honeycomb formed body 100. It is to be noted that when the die 1" of the present invention is used over a long period of time, the plated layer 51 and the coating layer 52 may be peeled off once, and the abrasion resistant layer 50 constituted of the double layer structure may be constituted again. It is to be noted that the abrasion resistant layer 50 is not limited to the abovementioned double layer structure of the plated layer 51 and the coating layer 52, and may be formed by a single layer or three layers or more. Furthermore, as the abrasion resistant layer 50, a hard material other than nickel and tungsten carbide may be used.

Furthermore, as the die of the present invention, the die substrate itself may be made of a cemented carbide material. In consequence, the abovementioned steps of constructing the plated layer 51 and the coating layer 52 can be omitted.

Hereinafter, the die of the present invention will be described on the basis of the following examples, but the die of the present invention is not limited to these examples.

EXAMPLES

(1) Preparation of Die

A plurality of dies were prepared in each of which a chamfering angle θ, a straight portion ratio (L/D)/% and an intersection point width ratio (W1/W2) matched the abovementioned defined conditions, respectively (Examples 1 to 7). Furthermore, dies in each of which at least one of the above parameters departed from the above conditions were also prepared for comparison (Comparative Examples 1 to 7). It is to be noted that the intersection point width ratio (W1/W2) of each of Comparative Examples 2 and 3 indicates a ratio of an intersection point width (W1) after round processing of each polygonal cell block corner portion to an intersection point width (W2) prior to the round processing. For the preparation of each die, as described above, it is possible to prepare the die by utilizing a well-known metal processing technology such as discharge processing, and hence, details are omitted here. Concerning conditions other than the above parameters, e.g., a material of a die substrate 40 and the like, the same conditions were set to the respective examples and the respective comparative examples to perform the preparation of the dies.

(2) Extrusion of Evaluation Honeycomb Formed Body

A material obtained by mixing a forming raw material mainly including ceramics containing alumina, kaolin and talc as main components and water was kneaded to obtain a honeycomb forming kneaded material. The kneaded material was inserted into an extruder, and extrusion of evaluation honeycomb formed bodies (evaluation samples) which became evaluation objects was performed by using the plurality of dies prepared by the above (1). Here, each of the evaluation honeycomb formed bodies was obtained by attaching the die prepared in (1) to an existing extruder, and extruding a forming material from the die on the basis of preset extruding conditions. After the extrusion, the die attached to the extruder was changed and an extruding operation was repeated, whereby there were obtained a plurality of types of evaluation honeycomb formed bodies extruded by using the dies formed at respective parameters (Examples 1 to 7 and Comparative Examples 2 to 6). Additionally, the forming material and forming conditions for use in the extrusion were constantly set in each die. Evaluation honeycomb structures were obtained from these honeycomb formed bodies through firing. In each of the evaluation honeycomb structures, a partition wall thickness of cell partition walls is set to 0.064 mm (2.5 mil), a cell density is set to 93 cells/cm$^2$ (600 cpsi), and a diameter and a height are set to 132 mmφ×114 mm.

(3) Preparation of Standard Honeycomb Formed Body

For the evaluation of an evaluation item of "a weight increase" (which will be described later in detail), a standard honeycomb formed body was prepared by using a standard die (corresponding to Comparative Example 1). Extruding conditions and the like were the same as in the above (2). Here, the standard die is a conventional type of die which has heretofore been used during extrusion, and is different from the die of the present embodiment in that the conventional type of die does not have any chamfered portions. That is, constitutions of the chamfered portions are not present in slit intersecting portions, a back hole side intersection point width W2 of each back hole is the same width as a slit side intersection point width W1, and straight wall surfaces extend to a substrate surface along an extruding direction. A standard honeycomb structure was obtained from the standard honeycomb formed body through firing. A partition wall thickness, a cell density, a diameter and a height of the standard honeycomb structure of Comparative Example 1 are set to the same values as in the evaluation honeycomb formed bodies. Furthermore, by use of a conventional standard die (corresponding to Comparative Example 7), there was obtained a standard honeycomb structure of Comparative Example 7 in which a partition wall thickness was 0.165 mm (6.5 mil) and a cell density was 62 cells/cm$^2$ (400 cpsi). A diameter and a height of the standard honeycomb structure of Comparative Example 7 are set to the same values as in the evaluation honeycomb structures.

(4) First Evaluation Item (Winding of End Face Shape)

End face shapes of the evaluation honeycomb structures and the standard honeycomb structure were visually confirmed by an operator, to judge presence/absence of each of "a deformation due to winding in a longitudinal direction" and "a deformation due to winding in a cross sectional direction". Here, determination criteria of the deformation due to the winding are visually judged. An example where the deformation due to the winding was not recognized was evaluated as "A", an example where the deformation due to the winding was slightly recognized, but was in an allowable range was evaluated as "B", and an example where the deformation due to the winding was noticeably recognized and was outside the allowable range was evaluated as "C", whereby the evaluations of the three stages were carried out. In consequence, a correlation between each parameter and the deformation due to the winding can be grasped.

(5) Second Evaluation Item (Weight Increase)

c Here, when a chamfering angle of a die is increased, an area of each slit intersecting portion in a substrate surface of a die substrate necessarily increases. Furthermore, when an intersection point width ratio of the die is a large value, a volume of a space to be occupied by chamfered portions of the slit intersecting portions of the die substrate necessarily increases. Consequently, there increase an area and a volume of each of honeycomb intersection portions 103 (corresponding to a portion in which a pair of cell partition walls 101 are orthogonal to each other) of a honeycomb formed body 100 which corresponds to a space including the slit intersecting portion and the chamfered portion.

The weight increase of each honeycomb structure incurs deterioration of a catalyst performance due to an increase of a heat capacity. Specifically, in a case where the honeycomb structure is used in a car exhaust gas purifying catalyst carrier, when the heat capacity increases, the time from the start of an engine until an activating temperature to activate a catalyst is reached lengthens. An exhaust gas is emitted without being purified, until the catalyst is activated, and hence, the catalyst requiring long time for the activation emits a lot of an unpurified exhaust gas. Therefore, as the evaluation item, "the weight increase" was employed, and an influence on a weight of the honeycomb structure when the chamfered portions were disposed was evaluated. Additionally, on the basis of a weight of the standard honeycomb structure, an example where the weight increase was hardly recognized or the weight increase was several % or less was evaluated as "A", an example where the weight increase was recognized, but was 15% or less to the standard honeycomb structure was evaluated as "B", and an example where there was recognized a weight increase of 15% or more to the standard honeycomb structure was evaluated as "C", whereby the evaluations of the three stages were carried out. It is to be noted that in weight measurement of the evaluation honeycomb structures and the standard honeycomb structure, there is usable a well-known measuring device having accuracy in the weight measurement by an electronic balance or the like.

Table 1 shows a summary of the respective evaluation items to the evaluation honeycomb structures prepared by using the dies of Examples 1 to 7 and Comparative Examples 1 to 7 as follows.

increase of a heat capacity is inhibited. Therefore, it is possible to continuously and stably form the honeycomb structure which is less influenced by the deterioration of the catalyst activity during use and has the suitable end face shape.

On the other hand, in the case of evaluation honeycomb structures (Examples 4 and 5) each extruded by using a die set so that an intersection point width ratio was a lower limit value (=1.5) of a defined range, a deformation due to winding was slightly recognized in a longitudinal direction and a cross sectional direction, or only in the longitudinal direction. It is supposed that when the intersection point width ratio was set to the lower limit value, a difference in density of a forming material and a difference in extruding speed between straight portions and chamfered portions were not sufficiently obtained, and the chamfered portions in the die of the present embodiment did not exert their effects. However, even this evaluation honeycomb structure is in a practically allowable range.

On the other hand, in the case of a honeycomb structure (Example 6) extruded by using a die whose intersection point width ratio was set to a defined upper limit value (=2.5), a weight increase from the standard honeycomb structure was slightly recognized. Here, when the intersection point width ratio is high, an area and a volume of slit

TABLE 1

|  | Parameter | | | Evaluation Item of Honeycomb Structure | | |
| --- | --- | --- | --- | --- | --- | --- |
|  | Chamfering angle θ | Straight portion ratio (L/D)/% | Intersection point width ratio (W1/W2) | Winding in longitudinal direction | Winding in cross sectional direction | Weight increase |
| Example 1 | 2.1 | 23 | 1.7 | A | A | A |
| Example 2 | 2.8 | 23 | 1.9 | A | A | A |
| Example 3 | 4.0 | 23 | 2.3 | A | A | A |
| Example 4 | 1.5 | 21 | 1.5 | B | B | A |
| Example 5 | 1.5 | 23 | 1.5 | B | A | A |
| Example 6 | 4.6 | 23 | 2.5 | A | A | B |
| Example 7 | 8.0 | 56 | 2.5 | B | A | B |
| Comparative Example 1 | 0.0 | 100 | 1.0 | C | A | A |
| Comparative Example 2 | 0.0 | 100 | 1.3* | C | B | A |
| Comparative Example 3 | 0.0 | 100 | 1.5* | C | C | A |
| Comparative Example 4 | 0.9 | 23 | 1.3 | C | C | A |
| Comparative Example 5 | 9.2 | 62 | 2.5 | C | A | B |
| Comparative Example 6 | 5.2 | 23 | 2.7 | A | A | C |
| Comparative Example 7 | 0.0 | 100 | 1.0 | A | A | C |

NOTE:
*There is indicated a ratio of an intersection point width before round processing of polygonal cell block corner portions to the width after the processing.

Consideration: Examples 1 to 7

As shown in Table 1, when each of respective parameters such as a chamfering angle θ, a straight portion ratio and an intersection point width ratio is in a range defined in a die of the present invention, suitable evaluations were obtained in any one of evaluation items of a deformation due to winding in a longitudinal direction and a cross sectional direction, and a weight increase (Examples 1 to 3). In consequence, it has been confirmed that the die of the present invention is suitable for extrusion of a honeycomb structure having a suitable end face shape. Furthermore, the weight increase from a standard honeycomb structure is hardly recognized, and hence, deterioration of a catalyst activity due to an intersecting portions increase, and hence, an amount of a forming material to be extruded through the slit intersecting portions increases. Therefore, it is supposed that honeycomb intersection portions of the honeycomb structure were thicker than usual and the honeycomb structure had a weight increase as compared with the standard honeycomb structure. However, this weight increase was only slight, and hence, the evaluation honeycomb structure in Example 6 is in the practically allowable range.

Furthermore, in the case of an evaluation honeycomb structure (Example 7) extruded by using a die whose intersection point width ratio was set to the defined upper limit value (=2.5) in the same manner as in Example 6 and whose chamfering angle θ was set to a defined upper limit value ($\theta=8.0°$), in addition to a slight weight increase from the standard honeycomb structure, a deformation due to winding in a longitudinal direction was slightly recognized.

Consideration: Comparative Examples 1 to 7

On the other hand, in the case of honeycomb structures (the standard honeycomb structure (Comparative Example 1) and Comparative Examples 2 and 3) each extruded by using a die which did not have any chamfered portions, a deformation due to winding in a longitudinal direction and a cross sectional direction was confirmed. It has been indicated that, in the die of the present invention, each chamfered portion formed at a defined chamfering angle $\theta$ is an essential constitution and such chamfered portions noticeably contribute to inhibition of the deformation due to the winding. Additionally, in the standard honeycomb structure (Comparative Example 7) extruded by using a conventional die which did not have any chamfered portions, winding in a longitudinal direction and a cross sectional direction was not seen, but a cell partition wall thickness was noticeably larger than thicknesses of the other honeycomb structures, and hence, a large weight increase was seen.

In the case of a honeycomb structure (Comparative Example 4) extruded by using a die whose chamfering angle $\theta$ was smaller than a defined lower limit value and whose intersection point width ratio was smaller than a defined lower limit value, a deformation due to winding was recognized in each of a longitudinal direction and a cross sectional direction. That is, even in a case where the die has straight portions, when the chamfering angle $\theta$ is small and the intersection point width ratio is small, influences of chamfered portions are hardly received, and a forming material is extruded as it is through slits. Therefore, it is supposed that the deformation due to the winding was therefore caused. On the other hand, in the case of a honeycomb structure (Comparative Example 5) extruded by using a die whose chamfering angle $\theta$ was larger than a defined upper limit value and whose straight portion ratio was larger than a defined upper limit value, a deformation due to winding in a longitudinal direction was recognized and a weight increase was slightly confirmed. It is considered that when the chamfering angle $\theta$ is larger than the upper limit value, an area and a volume of each slit intersecting portion increase, and a forming material is not smoothly extruded in an extruding direction, and hence, such deformation occurred. Furthermore, the area and volume of the slit intersecting portion increased, and hence, the weight increase from the standard honeycomb structure was confirmed. On the other hand, the intersection point width ratio was increased, and hence, the weight increase was confirmed (Comparative Example 6).

As shown in Examples 1 to 7 and Comparative Examples 1 to 7 described above, a honeycomb structure which does not have a deformation due to winding of an end face shape or a weight increase can be formed by performing extrusion with a die prepared on conditions satisfying parameters such as a chamfering angle $\theta$ which is from 1.0 to 8.0° and further preferably from 2.0 to 4.0°, a straight portion ratio which is from 20 to 60% and further preferably from 25 to 50%, and an intersection point width ratio which is from 1.5 to 2.5 and further preferably from 1.7 to 2.3.

A die of the present invention can be employed in an extruding device of a ceramic formed body.

DESCRIPTION OF REFERENCE NUMERALS 1, 1' and 1": die (a honeycomb formed body extruding die)
10: back hole
20: slit
21: slit intersecting portion
22: polygonal cell block
23a, 23b, 23c and 23d: corner portion
30: intersecting portion base portion
31: straight wall surface
32: straight portion
32a: one end of the straight portion
33: inclined wall surface
34: chamfered portion
35: corner portion
40: die substrate
41: forming material supplying surface
42: honeycomb formed body extruding ding surface
50: abrasion resistant layer
51: plated layer
52: coating layer
100: honeycomb formed body
101: cell partition wall
102: cell
103: honeycomb intersection portion
D: slit depth
L: length of the straight portion
R: partition wall thickness
r: curvature radius
S: virtual straight line
WS: slit width
W1: slit side intersection point width
W2: back hole side intersection point width
$\theta$: chamfering angle

What is claimed is:

1. A honeycomb formed body extruding die to extrude a honeycomb formed body, the die having two surfaces,
   wherein in a forming material supplying surface which is one surface, a plurality of back holes to introduce a forming material of the honeycomb formed body into the die are formed in an extruding direction,
   in a honeycomb formed body extruding surface which is the other surface, lattice-shaped slits corresponding to cell partition walls of the honeycomb formed body are formed in the extruding direction,
   the back holes communicate with the slits in slit intersecting portions of the slits,
   polygonal cell blocks defined by the slits comprise:
   chamfered portions in which parts of corner portions are chamfered at a chamfering angle of 1.0 to 8.0° to the extruding direction, from the honeycomb formed body extruding surface toward a slit depth direction; and
   straight portions which are not chamfered, and
   a ratio of a length of the straight portion to a slit depth is from 20 to 60%.

2. The honeycomb formed body extruding die according to claim 1,
   wherein widths of the slits are from 50 to 130 µm.

3. The honeycomb formed body extruding die according to claim 2,
   wherein a ratio of a slit side intersection point width to a back hole side intersection point width in the slit intersecting portions is from 1.5 to 2.5.

4. The honeycomb formed body extruding die according to claim 1,
   wherein a curvature radius of each of corner portions of the straight portion is from 0.03 to 0.08 µm.

5. The honeycomb formed body extruding die according to claim 1,
   wherein an abrasion resistant layer is formed on the surface of each of the polygonal cell blocks.

6. The honeycomb formed body extruding die according to claim 1,
   wherein the polygonal cell blocks are made of a cemented carbide material.

* * * * *